Sept. 11, 1945.  B. W. KEESE ET AL  2,384,470
DUAL ENGINE VEHICLE
Filed Sept. 10, 1940  5 Sheets-Sheet 1

Inventors
Beverly W. Keese
Arthur J. Hazen
By Strauch & Hoffman
Attorneys

Sept. 11, 1945.  B. W. KEESE ET AL  2,384,470
DUAL ENGINE VEHICLE
Filed Sept. 10, 1940   5 Sheets-Sheet 4

Inventors
Beverly W. Keese
Arthur J. Hazen
By Strauch & Hoffman
Attorneys

Sept. 11, 1945.  B. W. KEESE ET AL  2,384,470
DUAL ENGINE VEHICLE
Filed Sept. 10, 1940  5 Sheets-Sheet 5

Inventors
Beverly W. Keese
Arthur J. Hazen
By Strauch & Hoffman
Attorneys

Patented Sept. 11, 1945

2,384,470

UNITED STATES PATENT OFFICE 2,384,470

DUAL ENGINE VEHICLE

Beverly W. Keese and Arthur J. Hazen, Oshkosh, Wis., assignors to The Timken-Detroit Axle Company, Detroit, Mich., a corporation of Ohio Application September 10, 1940, Serial No. 356,214

7 Claims. (Cl. 180—54)

This invention relates to dual engine vehicles and is more particularly concerned with improved drive and control arrangements for such vehicles.

The broader aspects of the herein disclosed subject matter are claimed in applications Serial No. 527,782, filed March 23, 1944, by Walter F. Rockwell and Beverly W. Keese, for Automotive vehicle, and Serial No. 506,582, filed October 16, 1943, by Walter F. Rockwell and Beverly W. Keese, for Automotive vehicle.

Vehicles having separate engines connected to front and rear drive axles have heretofore been suggested. These prior vehicles, however, usually involved objectionably complicated and expensive devices for correlating control of the engines and drive mechanism wherein both engines and associated drive mechanisms were simultaneously operated at all times. Furthermore, none of these prior vehicles gave consideration to the proper distribution of power required at the front and rear drive axles, but all employed engines of the same power for driving the respective axles.

With the above in mind, it is a major object of the present invention to provide a dual engine vehicle having novel simplified and inexpensive control and drive arrangements.

It is a further object of the invention to provide a novel dual engine vehicle wherein separate engines drive the front and rear wheels, respectively, and wherein the engines are of different powers proportionate to the traction required or desired at the respective wheels. Specifically, a main engine driving the rear wheels and an auxiliary engine driving the front wheels are provided. Since the greater load is usually on the rear wheels, we prefer to employ a rear wheel driving main engine having about twice the power of the auxiliary engine driving the front wheels.

A further object of the invention is to provide a novel dual engine vehicle having a main engine and an auxiliary engine wherein the auxiliary engine may be selectively maintained inoperable to drive the vehicle, or connected to aid the main engine in driving the vehicle.

A further object of the invention is to provide a dual engine vehicle having rear and front drive axles driven by main and auxiliary engines, respectively, wherein the drive connection between the auxiliary engine and the front axle contains a clutch or similar disconnectible drive mechanism which is automatically controlled. Preferably this clutch is responsive to operation of the auxiliary engine and specifically a pneumatic operator connected to the intake manifold of the auxiliary engine is connected to the front axle clutch.

A further object of the invention is to provide a vehicle having a main engine connected to a rear drive axle and an independently operable auxiliary engine connected to a front drive axle, wherein novel mechanism including a single shiftable control member is provided for controlling actuation of the clutch, throttle valve and ignition assemblies of said auxiliary engine.

It is a further object of the invention to provide a dual engine vehicle wherein separate engines drive front and rear axles, respectively, with control mechanism of novel design interconnecting the transmissions of said engines.

It is a further object of the invention to provide a dual engine vehicle wherein the transmission units of the different engines are interconnected by novel motion transmitting linkage for simultaneously shifting gears in both transmission units, and wherein that linkage is inoperable to shift the gears in one of said units when its associated engine is idle.

A further object of the invention is to provide a dual engine vehicle wherein the clutch devices of the respective power units are novelly interconnected to be operated by a single clutch pedal or similar operator. Preferably, this interconnection is so controlled as to selectively render one of the clutch devices inoperable when its associated engine is not operating.

A further object of the invention is to provide novel throttle control mechanism for dual engine vehicles wherein actuation of the throttle valve of one of the engines is automatically prevented when that engine is not operating.

A further object of the invention is to provide a novel dual engine vehicle wherein the cooling systems of main and auxiliary engines are so interconnected that, when the main engine is operating and the auxiliary engine is idle, fluid heated by the main engine circulates through the auxiliary engine which is maintained warm and in condition for immediate starting. Preferably, we provide a booster pump speeding flow of the fluid whenever the auxiliary engine is also placed in operation.

Further objects of the invention will presently appear as the description proceeds in connection with the annexed drawings and the appended claims, in which

The invention will now be described as embodied in the conversion of a conventional automotive vehicle, having a single forwardly disposed engine connected to a rear drive axle, to a dual engine vehicle. This conversion comprises installation of an auxiliary engine and a special substitute front drive axle together with suitable control and drive mechanism. It will be understood, however, that the invention is not restricted to such conversions but is equally applicable in the construction of any vehicle wherein two or more engines are employed.

Figure 1:
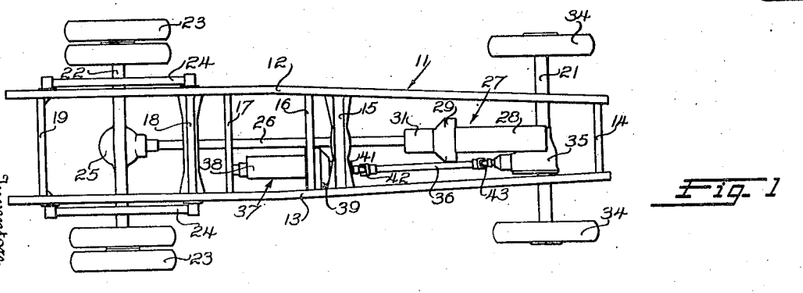
Figure 1 is a diagrammatic plan view of the dual engine and drive axle arrangements in a vehicle comprising a preferred embodiment of the invention.

Referring to Figure 1, vehicle chassis 11, having main longitudinal side frame rails 12 and 13 interconnected by a series of spaced cross members such as those indicated at 14, 15, 16, 17, 18 and 19, is supported by a front axle 21 and a rear axle 22.

Rear axle 22 is supported at opposite ends by dual ground engaging wheels 23 and is connected to the frame rails by suitable springs 24. Axle 22 is equipped with a differential bowl 25 and connected by a propeller shaft within a non-rotatable tubular housing 26 to a forwardly disposed main power unit designated at 27.

Figure 2:
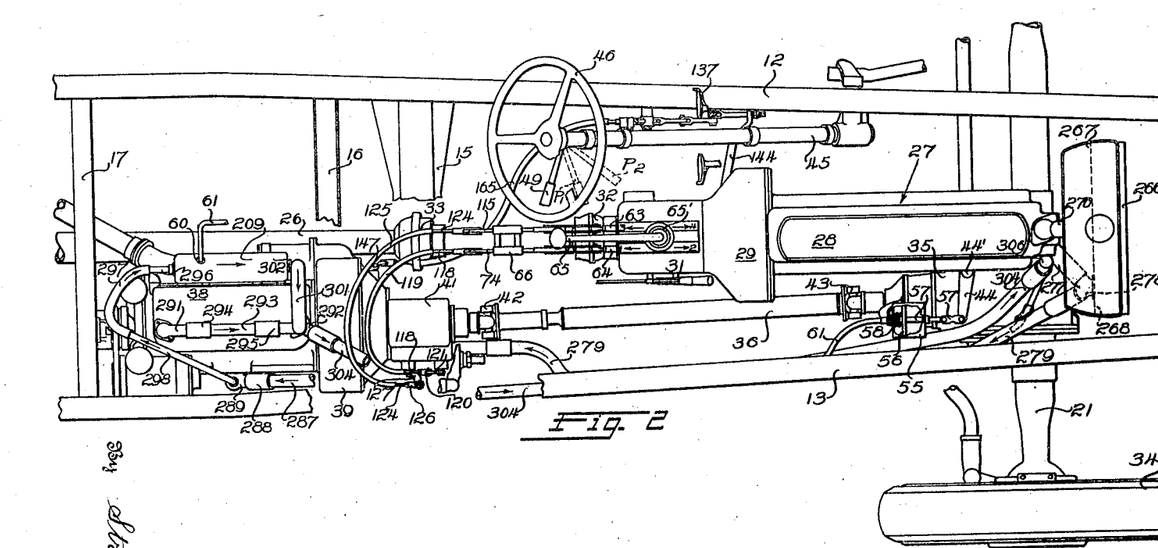
Figure 2 is an enlarged top plan view of a forward portion of the vehicle of Figure 1 illustrating the novel control and drive arrangements of the invention.

Main power unit 27 comprises an engine 28, clutch unit 29 and a transmission unit 31. The output end of transmission 31 is connected to the propeller shaft by a suitable universal joint within housing 32, (Figure 2). Propeller shaft housing 26 is provided with a second universal joint housing 33 where it is supported from cross member 15.

Drive axle 22, power unit 27, and the interconnecting propeller shaft are aligned along the longitudinal center line of the vehicle, and the mechanisms connecting them to the chassis are preferably the same as in any conventional front engine, rear drive axle truck, except for certain details to be later described.

Front axle 21 is supported at opposite ends by ground engaging wheels 34 which are dirigible for steering the vehicle. Axle 21 as illustrated is a drive axle provided with a differential housing 35. A propeller shaft 36 connects this differential to an auxiliary power unit 37 supported mainly by cross members 16 and 17 to one side of the longitudinal center line of the vehicle and disposed somewhat closer to the rear wheels than the front wheels.

Power unit 37 comprises an engine 38, clutch unit 39, and a transmission unit 41. The output end of the transmission unit is connected by universal joint 42 to the rear end of shaft 36, and a second universal joint 43 connects the front end of shaft 36 to the input end of differential 35.

Axle 21 may be any axle of the driven steering axle type, but preferably it is a double reduction axle such as that disclosed in Patent No. 2,309,432 issued January 26, 1943, to H. W. Alden for Motor vehicles. As described in the above-mentioned patent, the axle is provided with a suitable internal clutch device whereby the drive from the associated propeller shaft to the driven wheels may be interrupted as desired by the driver to thereby enable axle 21 to operate equivalently to the usual front dead axle.

The operator for this clutch device comprises a lever 44 secured upon the end of a clutch operating shaft 44′ emerging from the top of differential housing 35.

Axle 21 is connected to the chassis by suitable leaf springs 40.

Steering mechanism for operating dirigible wheels 34 comprises a rigid steering post 45 extending angularly upward from supporting frame rail 12 and carrying the usual steering wheel 46. Rotation of wheel 46 is transmitted to the illustrated steering linkage, the details of which are not part of the present invention and need not be described.

Figures 4, 5:
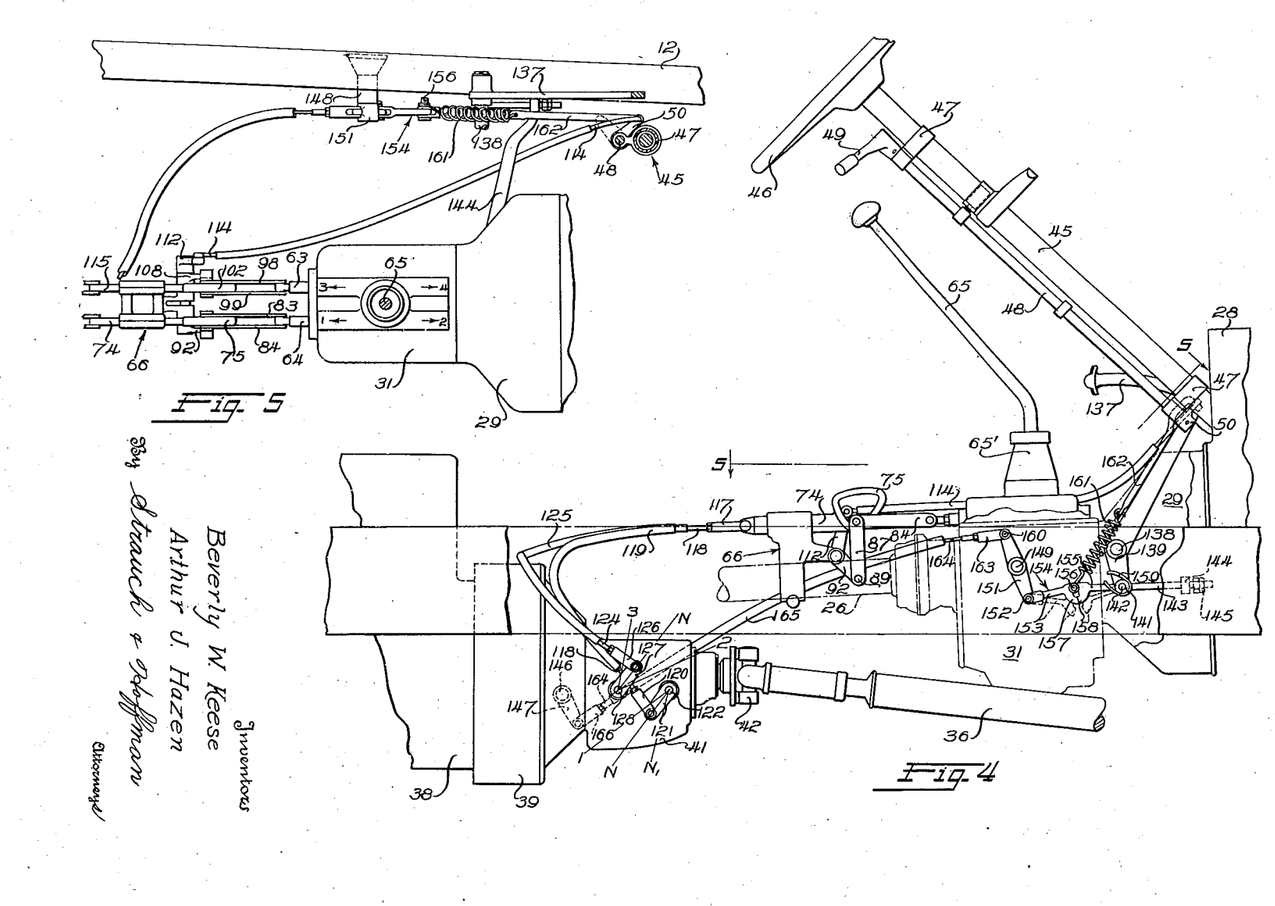
Figure 4 is a further enlarged elevation illustrating the clutch and transmission controls mechanism of the preferred embodiment of the invention.
Figure 5 is a view partly in section taken along line 5—5 of Figure 4 illustrating further the clutch and transmission operating mechanism.

As illustrated in Figure 4, spaced brackets 47 on steering post 45 rotatably support an elongated control rod 48 provided with a radial handle 49 disposed immediately beneath the steering wheel so as to be conveniently accessible to the hand of the driver.

Figure 3:
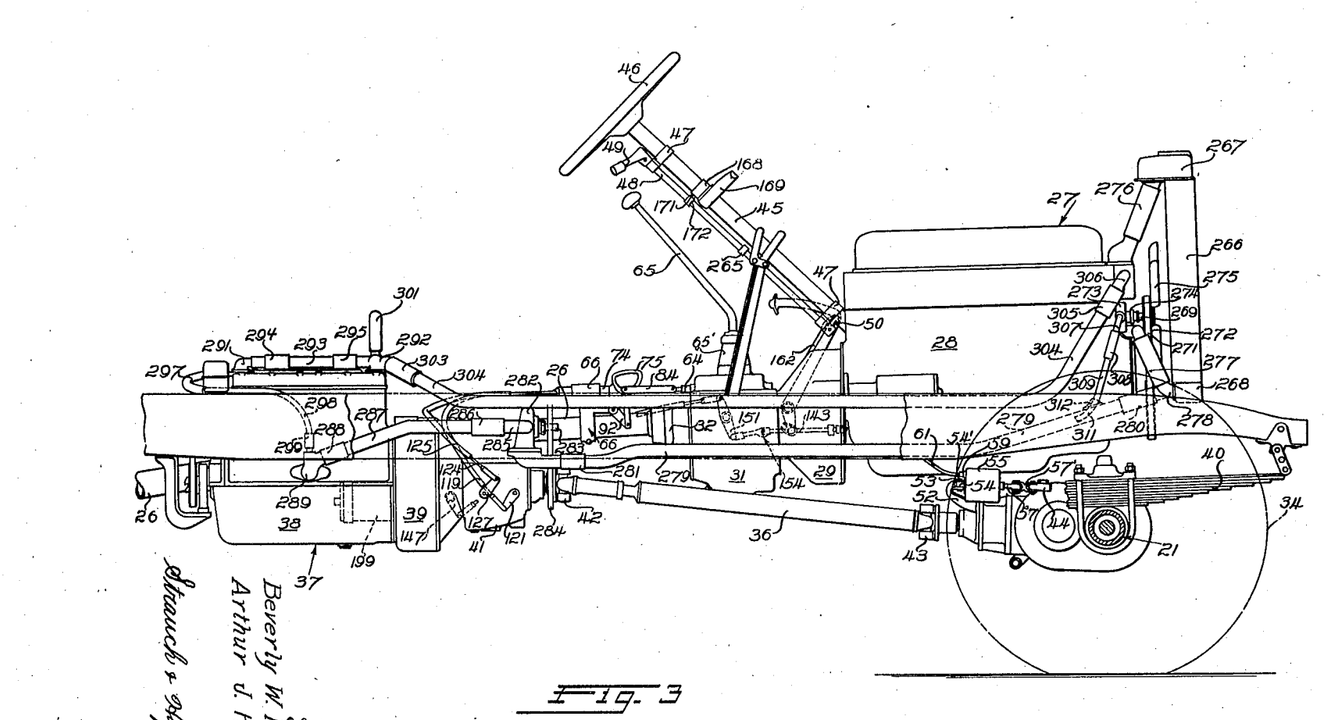
Figure 3 is a side elevation of the control and drive arrangements of the vehicle of Figure 2.

Rocking of handle 49 rotates rod 48 about its axis. Handle 49 is illustrated in Figures 2, 3 and 4 in full lines in what will be called its lower position. When the handle is in this lower position, the auxiliary engine is in operation as will presently appear. The upper position, wherein the auxiliary engine is not operating, is indicated in dotted lines at $P_2$ in Figure 2. An intermediate position $P_1$, the purpose of which will be described later, is also illustrated in Figure 2.

A radial arm 50 is non-rotatably secured on the lower end of rod 48.

Main power unit 27 is sufficient to drive the vehicle under most road and other conditions. Auxiliary power unit 37 operates independently of unit 27 and is employed only to aid main unit 27 in driving the vehicle under certain conditions where additional power or traction is required.

We have discovered that it is possible to employ an engine 38 which has only about one-half the rated power output of main engine 28. We are enabled to do this because the front axle load is considerably less than that on the rear axle so that less power is needed to drive the former.

The exact power ratio between the engines may be varied without departing from the spirit of the invention which requires only that the axle carrying the heavier load be driven by a proportionately higher powered engine than the other axle.

By using a small engine for driving the front axle, we are enabled to provide all necessary power while operating both engines at their most efficient operating speeds, thereby effecting considerable economy in fuel and other running expenses and saving unnecessary weight on the chasses so as to permit larger loads.

Front drive axle clutch

The invention includes an arrangement for automatically insuring that axle 21 is operated as a dead axle whenever auxiliary power unit 37 is not in operation.

A rearwardly and upwardly curved bracket 52 is rigidly secured upon differential housing 35 and is bifurcated at its upper end at 53 to pivotally embrace an ear 54 rigid with a fluid pressure cylinder casing 55. A suitable pivot pin 54' connects ear 54 to the bracket. Casing 55 is thereby flexibly supported upon a vertical pivot on the front axle housing.

Casing 55 houses a cylinder in which slides a piston 56. A piston rod 57, rigid with piston 56, extends through a suitable aperture in the front end of casing 55. A suitable motion transmitting link 57' has its opposite ends pivotally connected to piston rod 57 and clutch operating lever 44, so that the piston controls movement of lever 44. The purpose of the flexible mounting of casing 55 is to enable the casing to compensatively swing during rocking operation of lever 44 to maintain the piston aligned in the cylinder and thereby prevent binding of piston rod 57. The arrangement reduces wear and increases the useful life of the piston assembly.

Piston 56 is biased toward the right in Figure 2 by a suitable coil spring 58 extending between the rear wall of casing 55 and the rear face of the piston. The front face of piston 56 is exposed to atmospheric pressure. The rear wall of casing 55 is apertured to receive a suitable conduit fitting 59 attached to a hollow conduit 61 which extends along the chassis and is suitably connected to the intake manifold of auxiliary engine 38 as indicated at 60.

In this manner, the cylinder space between piston 56 and the rear wall of casing 55 is subjected to the intake manifold pressure of engine 38 so that whenever engine 38 is operating there will be a high vacuum in that space. The pressure differential thus created causes movement of piston 56 rearwardly against the force of spring 58 which is designed of insufficient strength to oppose such movement. Rearward movement of piston 56 rotates clutch arm 44 clockwise to the illustrated position of Figure 2 and causes engagement of the clutch device within housing 35. Reversely, when engine 38 is not operating there is no vacuum in the cylinder space rearwardly of piston 56; there is little or no pressure differential effective on the piston and spring 58 is sufficiently strong to move piston 56 forwardly, thereby rotating arm 44 counterclockwise to declutch the device within housing 35.

Spring 58 need not be located within casing 55, and may be attached directly to arm 44 to control the latter as above described. Axle 21 thereby automatically becomes a live axle whenever engine 38 is running and automatically becomes a dead axle whenever engine 38 is not in operation. By this arrangement, we insure against possibility of the idle auxiliary engine and/or its drive mechanism becoming a load on the main engine when the latter alone is driving the vehicle. This eliminates power waste, saves fuel and prevents wear on both power units.

Transmission mechanism

Figures 6, 8:
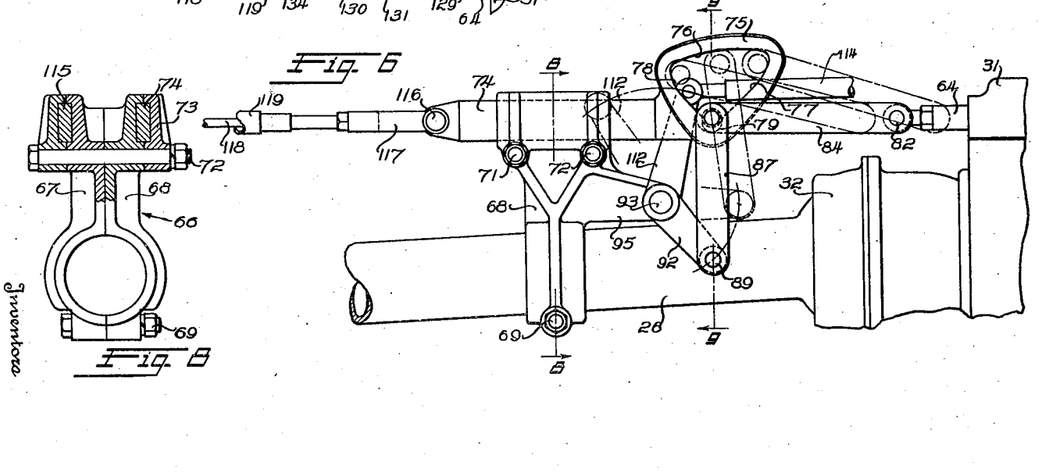
Figure 6 is an enlarged side elevation illustrating a preferred transmission shifting mechanism.
Figure 8 is a section along line 8—8 of Figure 6.
Figures 7, 9, 10:
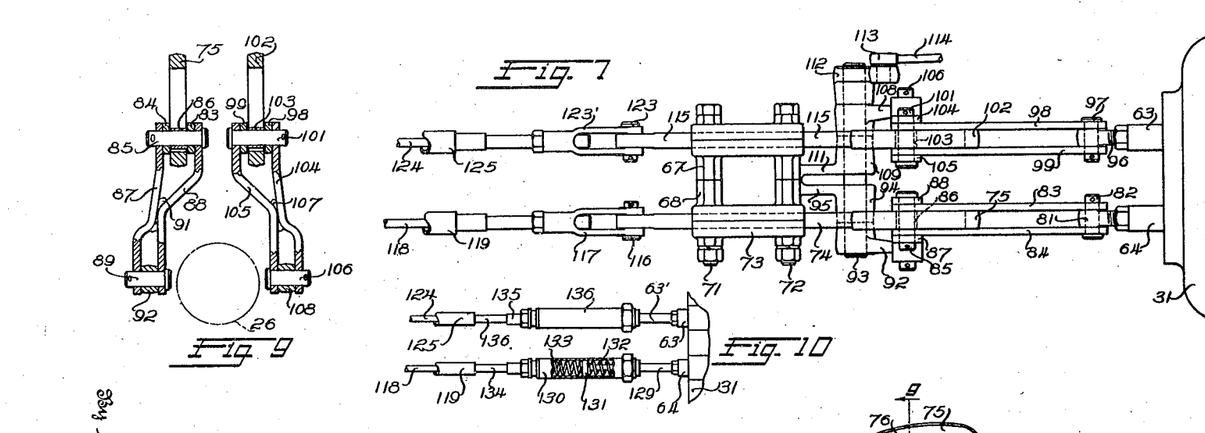
Figure 7 is a top plan view of the shifting mechanism of Figure 6.
Figure 9 is a section along line 9—9 of Figure 6.
Figure 10 is a top plan view of a modified transmission shifting mechanism which can be substituted for that of Figures 6-9.

Main transmission unit 31 is preferably a conventional type having four forward speeds and one reverse speed. The usual shifter rails 63 and 64 for the forward speeds are slidably mounted in the upper part of the transmission housing but project rearwardly a substantial distance therefrom as illustrated in Figures 2, 6 and 7.

Sliding movement of shifter rails 63 and 64 is effected by manipulation of manual transmission lever 65 which is universally mounted on the transmission housing at 65' and provided with the usual interconnecting mechanism for imparting sliding motion to the shifter rails. The arrows and numerals marked on the top of transmission housing 31 in Figure 2 indicate the direction of sliding of the rails 63 and 64 to engage the gears corresponding to the various speeds. Thus shifter rail 64 is slidable rearwardly and forwardly to engage the gears corresponding to first and second speeds, respectively, while rail 63 is slidable rearwardly and forwardly to engage the gears corresponding to third and fourth speeds, respectively. A third shifter rail (not shown) is employed for selecting reverse drive in the main power unit but this is conventional and will not be further described since it is not necessary to understand the present embodiment of the invention, wherein the main power plant only is employed to drive the truck in reverse.

Shifter rails 63 and 64 are suitably connected for concomitantly shifting the gears of auxiliary transmission 41 into speeds corresponding to those selected in main transmission 31 by manipulation of lever 65, as by the mechanism shown in enlarged detail in Figures 6-9.

Directly behind transmission unit 31 a two-part bracket 66, consisting of mated halves 67 and 68 rigidly bolted to each other and upon propeller shaft housing 26 by a plurality of spaced bolts 69, 71 and 72, provides a rigid support for the forward end of the motion transmitting linkage between rails 63 and 64 and the auxiliary transmission.

At its upper end, bracket portion 68 is provided with a removable side cap 73, and both bracket 68 and cap 73 are internally recessed to provide a rectangular guide for a slide bar 74. Cap 73 is maintained upon bracket 68 by bolts 71 and 72.

At its forward end, bar 74 is formed with a substantially triangular integral cam member 75 having three intersecting arcuate internal faces, 76, 77 and 78. At the intersection of surfaces 77 and 78, a relatively deep circular recess 79 is provided for a purpose later to be described.

The rear end of shifter rail 64 carries an apertured stud 81 through which passes a horizontal pivot pin 82 carrying the front end of parallel straps 83 and 84 which extend along opposite sides of cam 75 and are bridged at their rear ends by a suitable pivot pin 85. Pin 85 extends through the enlarged triangular aperture within cam 75 and rotatably carries a roller 86 disposed between straps 83 and 84 and within the cam opening. Roller 86 is of such size that it can drop into recess 79 to thereby place strap link 83, 84 in axial straight line relation with slidable rail 64 and slide bar 74, as illustrated in full lines in Figure 6.

Beyond straps 83 and 84, pivot pin 85 also carries the upper end of a pair of spaced straps 87 and 88 which, as illustrated in Figure 9, are bent outwardly to clear the propeller shaft housing and apertured at their spaced lower ends to receive pivot pin 89. Intermediate their ends, straps 87 and 88 are bent into substantial contact and secured together, as by welding, at 91 (Figure 9), to comprise an extremely rigid link. At its lower end, strap link 87, 88 embraces the apertured front end of a lever 92 to which it is connected by pivot pin 89. The rear end of lever 92 is non-rotatably secured upon the outer end of a shaft 93 rotatably mounted in apertured boss 94 at the front end of a rigid flange 95 extending forwardly from the upper part of bracket portion 68.

Shifter rail 63 is connected to motion transmitting mechanism identical with that above described. Rail 63 carries an axially extending apertured stud 96 through which passes a pivot pin 97 carrying the forward ends of a pair of spaced straps 98 and 99. At their rear ends, straps 98 and 99 are apertured to receive a pivot pin 101 and passing through the substantially triangular aperture of a cam 102 similar to cam 75. Pivot pin 101 also carries a rotatable roller 103 adapted to fit within a cam recess similar to that at 79, for placing strap link 98, 99 in straight line axial relation with rail 63.

Pivot pin 101 also carries the upper ends of a pair of outwardly and downwardly bent straps 104 and 105 having spaced apertured lower ends (Figure 9) through which passes a pivot pin 106. Intermediate substantially contacting portions of straps 104 and 105 are secured as by welding at 107 so that the straps comprise a rigid depending link between pivot pins 101 and 106.

Pin 106 passes through the apertured front end of a lever 108 which is non-rotatably secured at its rear end to an intermediate section of shaft 93 outwardly of supporting boss 109 on forwardly projecting bracket flange 111.

Shaft 93 extends beyond lever 108 and has non-rotatably secured thereto the lower end of a lever 112, the upper end of which (Figure 7) is provided with a suitable universal joint or like connection 113 to the rear end of a control link or Bowden wire connection 114. The front end of link 114 is pivotally connected to arm 50 adjacent its free end (Figure 5).

Cam 102 is integral with the front end of a flat slide bar 115 slidably supported in the upper end of bracket portion 67 in the same manner that bar 74 is supported in bracket portion 68.

The rear end of bar 74 is pivotally connected at 116 to the bifurcated end of a terminal block 117 securely attached to the front end of a Bowden wire 118 slidable within an armored cable 119. As illustrated in Figure 4, cable 119 extends rearwardly to auxiliary transmission 41 where wire 118 emerges and is securely attached to a fitting 120 pivotally connected to a transmission shifting lever 121, non-rotatably secured upon shaft 122 extending from the side of transmission 41.

The rear end of bar 115 is pivotally connected at 123 to bifurcated block 123' fastened to the forward end of a Bowden wire 124 slidably mounted in armored cable 125. Cable 125 also extends rearwardly to auxiliary transmission unit 41 where wire 124 emerges and is attached to a bifurcated fitting 126 pivotally connected to the free end of a transmission operating lever 127 non-rotatably mounted upon the end of a shaft 128 projecting from the side of transmission unit 41.

Cables 119 and 125 are suitably anchored intermediate their ends on chassis 11.

With the parts in the full line position indicated in Figure 6, rollers 86 and 103 are disposed in corresponding recesses 79 in cams 75 and 102, and strap links 83, 84 and 98, 99 are located in axial alignment with shifter rails 64 and 63 and slide bars 74 and 115, respectively. Shifting movements of rails 63 and 64, caused by manipulation of transmission lever 65, will be transmitted directly through the motion transmitting linkage of Figures 6–9 and wires 118 and 124 to transmission operating levers 121 and 127 just as though continuous connections existed between the shifter rails and the corresponding transmission operating levers.

Referring to Figures 2 and 4, sliding movement of rail 64 rearwardly to first speed of the main transmission is transmitted through link 83, 84, bar 74 and wire 118 to rock lever 121 counterclockwise from neutral position N to position $N_1$. Auxiliary transmission 41 is of a conventional type wherein position $N_1$ normally corresponds to reverse drive but, in the embodiment of the invention herein described, the reverse gears have been eliminated and position $N_1$ is therefore simply a second neutral position.

Sliding movement of rail 64 forwardly to second speed causes lever 121 to rock clockwise to position 1 where the auxiliary transmission gears are meshed for first speed. First speed of auxiliary transmission 41 is of such gear ratio as to drive front wheels 34 through the double reduction front axle 21 at the same peripheral speed that rear wheels 23 are driven by the main unit in second gear.

Sliding movement of rail 63 rearwardly to third speed is transmitted through link 98, 99, bar 115 and wire 124 to rock lever 127 clockwise to second speed position 2. Similarly, sliding movement of rail 63 forwardly to fourth speed causes lever 127 to rock counterclockwise to third speed position 3. The gear ratios of the main and auxiliary units are so correlated that the front and rear vehicle wheels are driven at the same peripheral speed at all times as explained above.

In the illustrated embodiment, therefore, the vehicle can be operated in reverse by the main unit only, while first, second, third and fourth forward speeds of the main unit correspond to neutral, first, second and third speeds of the auxiliary unit.

It is within the scope of the invention, however, to provide any suitable transmission unit at 41. We have considered employment of a duplicate four forward and reverse speed transmission unit at 41, which would be mechanically simpler to correlate to main transmission unit 31, but in view of the greater number and complexity of connecting linkages required for the latter, we have selected for the preferred embodiment of the invention the three forward speed auxiliary transmission above described, which has been found to be very efficient practically.

We have found it desirable, however, to interrupt transmission of motion between shifter rails 63 and 64 and the corresponding auxiliary transmission operating levers when the auxiliary engine is not operating in order to eliminate useless motion and wear and reduce the work of gear shifting. Operation of the machanism provided for this purpose for lifting rollers 86 and 103 out of the corresponding recesses 79 in the cams 75 and 102 and disposing the strap links carrying those rollers so that sliding motion of rails 63 and 64 will be lost at the cams will now be described.

With control rod 48 in the lower portion illustrated in Figures 2 and 4, the parts are in the full line positions of Figures 6 and 7 and arm 50 is in the full line position of Figure 5. Under these conditions, auxiliary engine 37 is operating and manipulation of lever 65 is effective to operate the auxiliary transmission as above described. Suitable spring and detent means (not shown) may be provided for holding rod 48 in its lower position so that link 114 maintains lever 112 in the forward full line position of Figure 6 and thereby retains rollers 86 and 103 in the cam recesses.

When it is desired to prevent lever 65 from operating the auxiliary transmission, control handle 49 is rocked upwardly to upper position P₂, counterclockwise in Figure 2 through about 90° of arc. Suitable spring and detent means (not shown) may be provided as desired for retaining rod 48 in position P₂. This movement effects counterclockwise rotation of arm 50 to its dotted line position of Figure 5 and, through arm 50 and link 114, effects counterclockwise rotation of lever 112 to its dotted line position of Figure 6. Rotation of lever 112 rocks shaft 93 and lever 92 and 108 counterclockwise to thereby raise strap links 87, 88 and 104, 105 to the intermediate dotted line position of Figure 6, thereby lifting rollers 86 and 103 from the cam recesses. As the rollers are lifted, strap links 83, 84 and 98, 99 rock about pins 82 and 97, respectively, out of alignment with the shifter rails.

Referring to Figure 6, when shifter rail 64 is displaced forwardly or rearwardly by reason of manipulation of lever 65, the rear end of strap link 83, 84 simply travels freely within the confined space bounded by cam faces 76, 77, and 78. No motion is imparted to bar 74 and consequently transmission lever 121 will not be actuated. Similarly, when shifter rail 63 is slidably displaced the rear end of strap link 88, 89 simply travels freely within the interior of cam 102 and no motion is transmitted to bar 115 or to transmission lever 127.

When it is again desired to simultaneously shift the gears of both transmissions, handle 49 is rocked downwardly or clockwise to its lower position and, by reverse operation of the mechanism above described, rollers 86 and 103 are once again reengaged in the corresponding cam recesses and the parts assume the full line position of Figure 6. If during this operation the gears in auxiliary transmission 41 happen not to be arranged in position to mesh properly, rollers 86 and 103 contact either of the opposite arcuate cam faces 77 or 78 during their downward travel and thereby move bars 74 and 115 to a position where the rollers can drop into recesses 79. This shift of bars 74 and 115 is effective to locate the gears in unit 41 for immediate gear shifting operations. This correlation of the transmissions is automatic and insures efficient and simultaneous shifting of the corresponding gears in the corresponding transmission units.

A form of transmission shifting linkage, which can be substituted for that of Figures 6-9 above described, is illustrated at Figure 10. A rearwardly projecting rod 129 secured to shifter rail 64 extends slidably within a short hollow spring housing 130 where it is provided with a rigid piston or washer assembly 131 slidable within the housing. Coil springs 132 and 133 are provided between opposite sides of the piston and the housing end walls. The rear end of housing 130 is rigidly attached to a fitting 134 on the forward end of Bowden wire 118.

Shifter rail 63 is provided with a rearwardly projecting rod 63' which is connected to Bowden wire fitting 135 by a yieldable joint 136 identical with that at 130.

During manipulation of lever 65, regardless of whether the auxiliary unit is idle or operating, the above described mechanism of Figure 10 shifts the auxiliary transmission gears. Springs 132 and 133 are of such strength as to maintain housing 130 and rod 129 against relative sliding movement during normal shifting operations but are yieldable to permit such slight relative movement as may be necessary for compensation where rails 63 and 64 have greater strokes than the associated operating levers on the auxiliary transmission.

Furthermore, should engine 38 be idle and the gears in transmission 41 stopped in non-engaging position, the joints at 130 and 136 will simply yield when lever 65 is manipulated and no gear shifting motion will be transmitted therebeyond.

Springs 132 and 133 are preferably sufficiently weak that they cannot overcome the force of the usual detent springs employed in transmission 31 to hold the shifter rails at selected speeds. For some transmissions, extra heavy detent springs are employed to avoid and overcome the effects of springs 132 and 133.

*Clutch mechanism*

The vehicle is equipped with a clutch pedal 137 of usual design rotatably supported on a rigid stub shaft 138 on the chassis and formed with a depending integral arm 139. Arm 139 terminates in an apertured boss 141 through which extends a pivot pin 142. A lever 143, pivotally connected at its rear end to pin 142 extends forwardly through the apertured terminal of a clutch actuating arm 144, and is provided beyond arm 144 with suitable lock nuts 145.

When clutch pedal 137 is depressed by the driver, it is rocked clockwise about shaft 138 (Figure 4) displacing lever 143 to the left and causing counterclockwise clutch disengaging motion (Figure 5) of arm 144. Main clutch unit 29 is conventional and need not be described further. The usual heavy return springs (not shown) are provided for returning clutch pedal 137 and associated parts to the position of Figure 4 when the driver releases the pedal.

Auxiliary clutch unit 39 is provided with a laterally projecting operating shaft 146 on which is non-rotatably mounted a clutch operating lever 147. Suitable mechanism interconnecting levers 137 and 147 for simultaneous operation of the two clutch units when lever 137 is depressed by the drive will now be described.

Referring to Figures 4 and 5, the inner side of chassis rail 12 is provided with a rigid bracket 148 carrying a stubshaft 149 upon which a lever 151 is pivotally mounted intermediate its ends. At its lower end, lever 151 is connected, as by pivot pin 152, to the rear end of an arm 153 comprising one arm of a compound link 154. The other arm 155 of link 154 is pivotally connected to pin 142 and arms 153 and 155 are interconnected by a common pivot pin 156. Below pin 156, arms 153 and 155 are formed with integral abutments 157 and 158 having adjacent flat faces eccentric from the axis of pin 156 and adapted to engage each other flush when the parts are in the full line position illustrated in Figure 4 wherein the center of pin 156 is displaced slightly above the line between the centers of pins 142 and 152.

Boss 141 carries a double armed spring 159 which urges rotation of link 155 counterclockwise and thereby tends to break link 154 to the open dotted-line position illustrated in Figure 4. This link breaking force of spring 159 is resisted by a coiled tension spring 161 connected at its lower end to pivot pin 156 and at its upper end to a rod 162 pivotally connected to the terminal end of arm 50. As illustrated in Figures 4 and 5, spring 161 which is stronger than spring 159 is maintained under sufficient tension when the control rod 48 is in lower position to overcome spring 159 and maintain links 154 closed.

At its upper end, lever 151 is pivotally connected at 160 to a bifurcated fitting 163 secured to the forward end of a Bowden wire 164 slidable within armored cable 165 which extends rearwardly to auxiliary clutch 39. Cable 165 is suitably anchored on the chassis. At clutch 39, wire 164 emerges from the cable and is provided with a rigid fitting 166 pivotally secured to the free end of clutch operating lever 147.

With the parts in the full line position illustrated in Figures 4 and 5, depression of lever 137 is effective through compound link 154, lever 151 and the Bowden wire mechanism to rock clutch operating lever 147 counterclockwise to clutch disengaged position, thereby concomitantly declutching both units. During this operation, compound link 154 does not break due to abutments 157, 158 and the superior strength of tensioned spring 161.

When control handle 49 is rocked upwardly to the dotted line position P2 illustrated in Figure 5 so that arm 50 is rocked counterclockwise, such relieves or eliminates the tension on spring 161 and enables the weaker spring 159 to break link 154 to the dotted line position illustrated in Figure 4. Link 154 is a toggle wherein spring 159 is strong enough to snap pin 156 to a point well below the line between pins 142 and 152 when tension of spring 161 is released. When pedal 137 is now depressed, rocking the pedal simply further breaks link 154 and no motion is transmitted therebeyond.

Control rod 48 therefore selectively permits operation of clutch 41 and transmission 39 of the auxiliary unit by the control levers of the main power unit.

*Auxiliary engine ignition and starter control*

The vehicle of the invention is provided with an auxiliary engine ignition switch unit 167 carried by a suitable bracket 168 on the steering post 45 just above a brace 169 which is used to anchor the upper part of the post to the usual dash assembly (not shown).

Switch unit 167 is provided with a push button control 171 projecting into contact with the face of cylindrical cam 172 fixed upon control rod 48.

Figure 11:
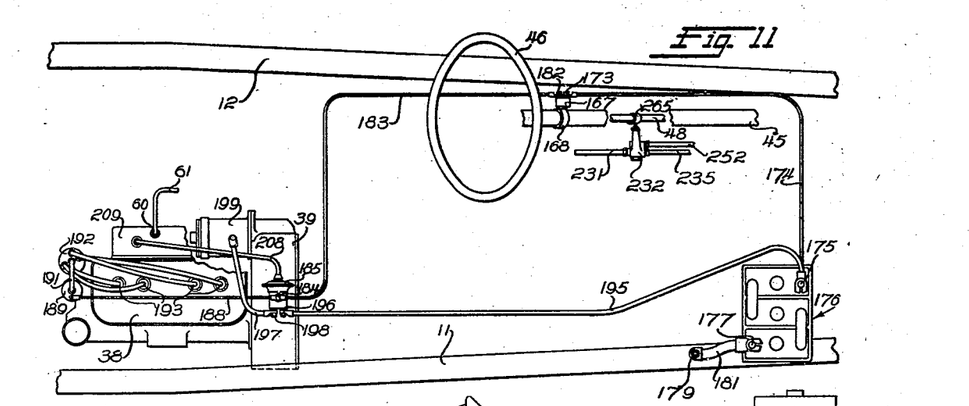
Figure 11 is a diagrammatic view illustrating the ignition and starter control circuits for the auxiliary engine.

Referring to Figure 11, one terminal 173 of switch unit 167 is connected by an insulated wire 174 to terminal 175 of battery 176 or to a live post connected to said terminal. Battery 176 is of the usual heavy-duty type supplied for single engine automotive vehicles. The other battery terminal 177 is grounded to chassis rail 13 at 179 by a suitable strap 181.

Figures 12, 13:
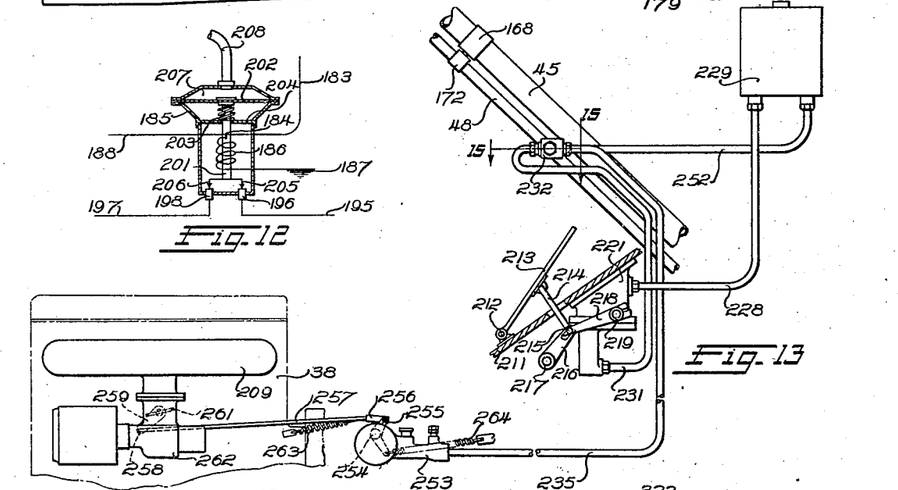
Figure 12 is a diagrammatic view illustrating the pneumatic control switch in the starter circuit.
Figure 13 is an elevation illustrating diagrammatically the throttle control arrangements for the auxiliary engine.

The second switch unit terminal 182 is connected by an insulated wire 183 to a binding post 184 projecting from a housing 185 preferably suitably rigidly supported on clutch unit 39. Referring to Figure 12, binding post 184, within housing 185, is connected to one end of a solenoid coil 186 and the other end of the coil is grounded to the clutch housing or frame at 187. This provides a solenoid coil circuit within for a purpose later to be described.

Binding post 184 is connected by an insulated wire 188 to the usual high tension coil 189 of engine 38, and coil 189 is connected by cable 191 to the usual distributor 192 from which separate wires lead to the individual spark plugs 193.

The starter motor electrical circuit of engine 38 comprises an insulated wire 195 connecting battery terminal 175 to a projecting terminal 196 at the lower end of housing 185. A second insulated wire 197 connects a second terminal 198 at the bottom of housing 185 to the starting motor 199. Motor 199 is suitably grounded to the frame to complete the circuit therethrough.

Referring again to Figure 12, a solenoid core 201 is slidably mounted within coil 186. When coil 186 is not energized, core 201, which is rigidly secured to the center portion of a flexible diaphragm 202 within the upper part of the housing, is maintained in its upper position by diaphragm 202 and a coil spring 203 which reacts against a stationary partition wall 204 within the housing. Spring 203 is designed to be just sufficiently strong to maintain core 201 in an elevated position wherein its depending contact points 205, 206 are separated from terminals 196 and 198 when coil 186 is de-energized.

Above diaphragm 202, housing 185 is formed with a chamber 207 which is connected by a suitable conduit 208 to the intake manifold 209 of engine 38. Diaphragm 202 is thereby subjected at one side to the vacuum in manifold 209. Suitable apertures are provided in housing 185 for exposing the lower side of diaphragm 202 to atmosphere.

With engine 38 idle, handle 49 is in upper position P2. To place auxiliary engine 38 in operation, the driver grasps handle 49 and rocks it downwardly toward the full line lower position described above. As rod 48 turns about its axis, cam 172 actuates push button 171 to close switch 167. Preferably cam 172 is so designed that switch 167 is closed by the time handle 49 reaches intermediate position P1 and remains closed through to the lower position for a purpose to be described.

Closing of switch unit 167 establishes the ignition circuit of engine 38 which comprises battery 176, wire 174, switch 167, wire 183, post 184, wire 188, coil 189, cable 191, distributor 192 and spark plugs 193.

Besides closing the ignition circuit, the above described rocking of rod 48 closes the circuit to starting motor 199 because coil 186, connected between the now live binding post 184 and the chassis ground, is thereby energized and pulls core 201 downwardly to close the electrical circuit between terminal posts 196 and 198. Spring 203 is sufficiently weak to permit this operation. Starting motor 199 immediately begins to rotate flywheel of motor 38 in the usual manner until the engine starts. As soon as the engine starts, the pressure in the intake manifold 209, which is approximately atmospheric during the idle period of the engine, becomes sub-atmospheric and effective through conduit 208 to reduce the pressure in chamber 207. When the suction in intake 209 reaches its normal operating vacuum, such is sufficient to displace diaphragm 202 upwardly against the force of solenoid 186 to separate contacts 205, 206 from terminals 196, 198 and thereby break the starter circuit. Diaphragm 202 is aided in this operation by spring 203. The intake vacuum thereby maintains the starter circuit open while engine 38 is operating and, should engine 38 stall during operation of the vehicle, motor 199 will immediately automatically be placed in operation until the engine again starts.

It may be desirable to break the circuit through solenoid 186 when the starter motor is inoperative. For accomplishing this operation, we may provide a suitable switch in the line between binding post 184 and coil 186 and a suitable connection between the switch and core 201 adapted to open the switch whenever the core is elevated to a predetermined position. Restoration of handle 49 to position P₂ shuts off the ignition of engine 38.

Auxiliary engine throttle control mechanism

Floor board 211 carries a suitable bracket 212 upon which is pivoted an accelerator pedal 213 bearing on the upper end of throttle control rod 214 projecting through floor 211. Below the floor, rod 214 is pivotally secured at 215 to a lever 216 rigid with a rock shaft 217. Rock shaft 217 is connected to control opening and closing movements of the carburetor valve of main engine 28 by conventional mechanism, the details of which are not part of the present invention and further description thereof is not necessary.

Figure 14:
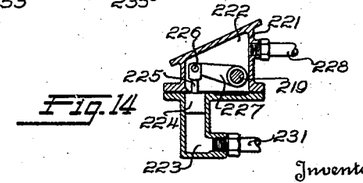
Figure 14 is a section through the master throttle control cylinder of Figure 13.

Rod 214 is further pivotally connected at 215 to the free end of lever 218 secured upon the projecting end of a rotatable shaft 219 projecting from a hydraulic master cylinder housing 221 mounted beneath floor 211. Housing 221 (Figure 14) comprises a reservoir chamber 222 and a piston chamber 223 in which slides a piston 224 having an upstanding rod 225 pivotally connected at 226 to the free end of a lever 227 rigid with shaft 219.

Chamber 222 is connected by conduit 228 to the lower end of a main fluid reservoir 229. Piston chamber 223 has its outlet connected by a tubular conduit 231 to a valve casing 232.

Figure 15:
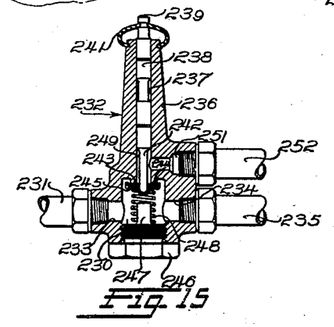
Figure 15 is an enlarged section along line 15—15 of Figure 13 illustrating the valve in the hydraulic throttle control line.

As illustrated in Figure 15, valve casing 232 comprises a casting formed with an internal chamber 230. Diametrically opposite bores 233 and 234 communicate radially with chamber 230. Conduit 231 is threadedly secured to bore 233 and a conduit 235 is threadedly secured to bore 234.

Valve casing 232 is provided with an elongated projection 236 having a central bore 237 communicating with chamber 230. A valve operating rod 238 is slidably mounted in bore 237. Rod 238 is formed with a terminal button 239 exteriorly of projection 236, and a suitable flexible fluid-tight seal 241 is provided between button 239 and the end of projection 236. At its inner end, rod 238 is reduced in cross section at 242 and extends through a valve seat 243 surrounding the inner end of bore 237. The valve on seat 243 comprises an annular sealing washer 244 of flexible material carried by a rigid plate 245 having a central pocket adapted to receive the inner end of valve rod 238.

In the wall of chamber 230 opposite valve seat 243, casing 232 is formed with a threaded aperture in axial alignment with bore 237. A suitable fluid tight plug 246 is secured in this aperture and its inner end carries an upstanding post 247 surrounded by a coil spring 248 extending between the plug and plate 245. Spring 248 is of sufficient strength to normally maintain washer 244 tightly on the valve seat to thereby insure against passage of fluid from chamber 230 to bore 237.

When valve assembly 244, 245 is displaced from the valve seat, as by inward axial sliding movement of rod 238, fluid is enabled to flow from chamber 230 through the annular passage 249 surrounding reduced portion 242 of valve rod 238 into a bore 251 in the side of the casing. Bore 251 is threadedly connected to a conduit 252 leading to main fluid reservoir 229.

Conduit 235 is connected to a slave cylinder and piston assembly 253 which controls movement of rock shaft 254 projecting exteriorly of the cylinder. A lever 255, rigid with rock shaft 254, is pivotally connected at 256 to one end of a rod 257. Rod 257 is pivotally connected at 258 to the free end of an arm 259 secured upon the shaft of the usual carburetor butterfly valve 261 of carburetor 262. Suitable return springs 263 and 264 normally urge valve 261 toward closed position.

Control rod 48 has rigidly secured thereto a cam 265 having a face contacting button 239 of the valve rod 238. Cam 263 has a high portion which maintains rod 238 displaced axially inwardly to space the valve from the valve seat and expose passage 249 to chamber 230 when rod 48 is in its upper position P₂. Upon return of rod 48 to its lower position, spring 248 forces the valve back upon its seat.

With control handle 49 in its lower position, the low point of cam 265 is in contact with button 239 and the valve parts in casing 232 are positioned as illustrated in Figure 15.

Under these conditions, manipulation of pedal 213 actuates the carburetor valve of the main engine as usual and also concomitantly actuates carburetor valve 261 since piston 224 is in direct fluid connection with slave cylinder 253 through conduit 231, chamber 230 and conduit 235. Since washer 244 is pressed tightly against seat 243 by spring 248, no fluid from chamber 230 can escape to conduit 252.

When control handle 49 is in its upper position, the high point of cam 265 displaces valve rod 238 inwardly to open communication between chamber 230 and conduit 252 as explained above. Thus, fluid displaced from chamber 230 is by-passed through passage 249, bore 251 and conduit 252 to reservoir 229. Although passage 249 is smaller in area than conduit 235, the resistance of the slave cylinder assembly and springs 263 and 264 is such as to prevent displacement of any fluid within conduit 235 when the accelerator pedal is pressed down under these conditions and valve 261 is not operated by movement of pedal 213.

Cooling system

Radiator 266 is supported on the chassis forwardly of main engine 28, and is provided with an upper tank 267 and a lower tank 268. This radiator is of appreciably greater capacity and cooling power than a radiator designed for engine 28 alone, being thicker and having larger upper and bottom tanks and more exposed cooling tube surface than the single engine radiator. In designing radiator 266, the volume of water or equivalent cooling fluid in each engine system is ascertained, and the radiator constructed to handle the sum of those volumes.

Motor 28 continuously drives a fan shaft 269 by means of a fan belt 271 and a pulley 272 on the shaft. Fan shaft 269 drives a main engine water pump 273, which is provided with a packing chamber 274, and carries a fan 275. Water pump 273 is the pump designed for engine 28, but fan 275 is appreciably larger and more efficient than the fan designed for engine 28 alone. If necessary, the fan belt and pulley drive can be strengthened to assure efficient drive of the heavy fan. Fan 275 and radiator 266 are cooperatively designed for efficient cooling.

Upper tank 267 is connected to one end of the cooling fluid circulating passages of engine 28 by suitable fittings and the flexible conduit indicated at 276, and lower tank 268 is connected to the other end of the engine cooling fluid circulating passages by the fittings and flexible conduit indicated at 277. These fittings and conduits preferably are those supplied with engine 28, although such can be replaced by larger capacity conduits if necessary or desirable.

Lower tank 268 is provided with a branched pipe outlet 278. One arm of outlet 278 is connected to conduit 277. The other arm of outlet 278 is connected by a short flexible coupling 280 to a rigid tubular conduit 279 extending rearwardly along the chassis to a point forwardly of auxiliary engine 38 where a short flexible coupling 281 conects conduit 279 to a booster pump assembly 282.

Pump shaft 283 is preferably driven by a suitable pulley and belt assembly 284 from the transmission output shaft of auxiliary transmission 41. If desired pump 282 may be driven from the cam shaft of engine 38. Outlet pipe 285 of pump 282 is connected by a short flexible coupling 286 to the forward end of a rigid conduit 287, and the rear end of conduit 287 is connected by short flexible coupling 288 to a branched pipe fitting 289 at the side of engine 38. Fitting 289 opens to the cooling fluid circulating passages of engine 38.

The cooling fluid circulating passages of engine 38 open to a pipe elbow 291 upstanding at the rear of the engine and a branched fitting 292 upstanding at the front of the engine. Elbow 291 and fitting 292 are interconnected by a rigid conduit 293 and a pair of short flexible couplings 294 and 295.

Intake manifold 209 of engine 38 is surrounded by a water jacket which is connected by pipe 296, flexible conduit 297, rigid conduit 298 and a short flexible conduit 299 to an arm of fitting 289. An inverted U-shaped conduit 301 connects outlet 302 at the forward end of the manifold water jacket to fitting 292.

A short flexible coupling 303 connects fitting 292 with the rear end of a rigid conduit 304 which extends forwardly to the front end of engine 28 where it is connected to the fluid circulating passages of that engine by a short flexible coupling 305 and an elbow 306.

At the output side of pump 273, an outlet 307 is connected by a flexible coupling 308 to a rigid conduit 309 having an arcuate terminal nozzle 311 projecting within conduit 279. Nozzle 311 is of relatively small cross section as compared to conduit 279 and extends rearwardly so that it discharges fluid rearwardly and parallel to the axis of conduit 279. A flexible fluid tight joint 312 seals the joint between conduits 279 and 309.

In operation, while the main engine 28 only is operating, cooling fluid is circulated through radiator 266, conduits 276 and 277 and the cooling fluid passages in engine 28.

Fitting 307, conduits 308 and 309 and nozzle 311 comprise an ejector system of calibrated capacity for discharging hot water into conduit 279. The stream issuing from nozzle 311 is of such velocity as to create a slow flow of water in conduit 279 away from tank 268 and toward the auxiliary engine cooling system. Pump 282 is driven only when engine 38 is operating, but it is of the centrifugal or like type which permits free passage of water therethrough without obstruction when idle.

Water from conduit 279, after passing pump 282, continues through conduit 287 to fitting 289 where it enters the cooling fluid circulating system of engine 38 and emerges therefrom at fittings 291 and 292. A part of the water entering fitting 289 is by-passed through conduits 296, 297, the water jacket of the intake manifold and conduit 301 before reaching fitting 291. From fitting 291, the water in engine 38 travels forwardly through conduit 304 to fitting 306 where it rejoins the water pumped through the main engine by pump 273 and is delivered to radiator 266 for cooling.

In this manner, while engine 28 alone is operating a slow continual circulation of warm water is assured through the auxiliary engine cooling fluid circulating system and through the auxiliary engine intake manifold water jacket. This arrangement automatically maintains engine 38 warm and in condition for immediate starting when such is desired.

When engine 38 is started, the above described slow circulation is insufficient to maintain its temperature at a proper level. But booster pump 282, which is driven by engine 38, automatically speeds up flow of water through engine 38 and insures proper cooling.

Vehicle operation

The vehicle is placed in initial operation by closing the main ignition switch and starting main engine 28 in the usual manner. At this time control rod handle 49 is in its normal upper position $P_2$. While engine 28 is alone operating, cooling fluid is circulated therethrough by pump 273 and a slow circulation of fluid between the radiator 266 and the cooling fluid passages of the auxiliary engine 38 is started because of the injector action at nozzle 311.

The vehicle is rarely driven from a standstill with both engines driving it. Hence the first step in placing the vehicle in motion is to depress pedal 137 and manipulate lever 65 to select first speed of main transmission 31 as in the usual vehicle.

This depression of pedal 137 disengages clutch 29 but serves only to further break link 154 beyond the dotted line position of Figure 4 so that movement of pedal 137 is lost in link 154 and clutch 39 is not disengaged as above explained.

Further, since control rod 48 is in upper position so that rollers 86 and 103 are disconnected from recesses 79, manipulation of shift lever 65 has no effect beyond the lost motion mechanism on bracket 66 and there is no shifting of gears in auxiliary transmission 41.

Manipulation of pedal 213 at this time operates only the main engine carburetor valve since the hydraulic line controlling valve 261 is bled to reservoir 229 when handle 49 is in upper position. This prevents fuel from being pumped into the auxiliary engine when it is idle and thereby insures against fuel wastage.

The driver may then proceed to shift through second, third and fourth speeds of main transmission 31, to operate the vehicle as though it were a single engine vehicle. During this period the auxiliary power plant is wholly inoperative and front axle 21 runs as a dead axle because the clutch mechanism in housing 37 is maintained disengaged by spring 58.

Assume now that a condition is reached, such as a sandy road or a stiff grade, where it is desired to employ both engines for driving the vehicle. Auxiliary engine 38 is started by simply depressing clutch pedal 137 and then rocking handle 49 downwardly to close the auxiliary engine ignition and starter circuits. As above described, ignition switch 167 is closed by the time handle 49 reaches intermediate position $P_1$. For best results we allow the handle to dwell at this position $P_1$ temporarily until engine 38 starts, and then pull handle 49 directly to its lower limit position to effect full operation of the transmission control linkage of Figures 6-9. Engine 38 starts almost immediately because its cylinders and intake manifold have been warmed by the above described slow circulation of fluid heated by operation of engine 28.

As soon as engine 38 starts, its normal intake manifold vacuum is established and such is effective through conduit 208 to break the starter circuit and through conduit 61 to cause the pneumatic operator at 55 to rock lever 44 to engage the clutch and complete the drive within housing 37. Axle 21 thereby becomes a drive axle automatically upon starting of engine 38. Any other suitable mechanism automatically causing engagement of the clutch in housing 37 upon downward rocking of handle 49 may be employed without departing from the spirit of the invention.

Downward rocking movement of handle 49 is also effective through cam 265 and valve 232 to establish hydraulic control of auxiliary throttle valve 261 by pedal 213 as above described.

The above described downward rocking of handle 49 places spring 161 under such tension as to urge link 154 toward the closed full line position of Figure 4. It will probably be necessary in the illustrated embodiment to double clutch at this time, because initial depression of pedal 137 just before downward rocking of handle 49 breaks link 154 and it is necessary to allow clutch pedal 137 to return to engaged position to enable the tension of spring 161 to establish rigid link 154 before again depressing the clutch pedal to concomitantly operate both clutches.

When clutch pedal 137 is depressed, with both engines in operation, such movement is transmitted through rigid link 154 to disengage clutch 39 at the same time that clutch 29 is disengaged. Moreover, manipulation of shift lever 65 is now effective to concomitantly actuate transmissions 31 and 41 since the rocking of handle 49 to lower position also establishes the motion transmitting connection of Figures 6-9 as above described.

In the illustrated embodiment of the invention, the auxiliary power plant is usually never operated while reverse or first speeds of the main power unit are employed. If the auxiliary engine should happen to be operating when main unit 27 is driving the vehicle in reverse, the auxiliary transmission by remaining in neutral prevents the auxiliary engine from driving the vehicle. However, when transmission 31 is shifted to second, third and fourth speeds, transmission 41 is automatically shifted to corresponding first, second and third speeds, respectively.

Booster pump 282 automatically goes into operation upon starting of the auxiliary engine and insures sufficiently swift circulation through that engine to provide efficient cooling to desired running temperature.

The auxiliary power unit, when not required to drive the vehicle, is thrown out of operation by the simple motions of depressing clutch pedal 137 and then rocking handle 49 upwardly to the upper position $P_2$.

When the invention is embodied in a conversion job as above described, incorporation of the auxiliary engine and controls upon the standard chassis is made with a minimum of labor and expense, as many of the conventional parts of the standard chassis being retained as possible.

The vehicle of the invention is economical and flexible in operation. It can be driven with single engine economy under ordinary road conditions, and the auxiliary power unit is instantly available where increased traction and power are needed to maintain speed.

Operation of the vehicle is fool-proof since all control of the auxiliary power unit is effected by rocking a single control rod 48.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a main engine having a variable speed transmission, a slidable shifter rail in said transmission, an auxiliary engine having a variable speed transmission, operating linkage extending from said auxiliary engine transmission to a point adjacent said shifter rail and terminating in a reciprocable member, a link piv    to said shifter rail, and a releasable motion transmitting connection between said link and member.

2. In the vehicle defined in claim 1, said member comprising a box cam having an internal recess and an adjacent internal cam face, and said link carrying a roller adapted to be seated in said recess, said roller when removed from said recess being confined within said cam.

3. In a vehicle, a pivoted clutch pedal, a first clutch operatively connected with said pedal, a movable clutch operating lever, a second clutch operatively connected with said lever, motion transmitting means including a toggle linkage interconnecting said pedal and lever, and means selectively locating said linkage on opposite sides of a dead center position for rendering said linkage operative and inoperative respectively to transmit motion of said pedal to said lever.

4. In a vehicle, an internal combustion engine assembly including an ignition system, and an electric starter motor; a drive axle and a disconnectible drive connection between said engine and said axle, a movable control member for said drive connection shiftable between at least two positions to render said drive connection operative or inoperative; means actuated by said member in the position rendering said drive connection operative closing the the ignition and starter motor electrical circuits, and means automatically breaking said starter motor circuit when the engine is operating.

5. In a heavy duty automotive vehicle having a rear drive axle and a front steering axle; a main engine carried by said vehicle; a drive mechanism including a change speed transmission and a clutch drivingly connecting said main engine with said rear drive axle; an auxiliary engine carried by said vehicle having an ignition and starting system independent of said main engine; drive mechanism including a clutch and change speed transmission operative to drivingly connect said auxiliary engine with said front axle; and means including a single manually movable element having two operative positions operative when moved from one to the other of said positions to start said auxiliary engine and establish an operative control connection between said main engine transmission and said auxiliary engine transmission, and an operative control connection between said main engine clutch and said auxiliary engine clutch.

6. The vehicle as defined in claim 5, including a fuel charge controlling valve operatively associated with said main engine; a manually operable control for said valve; a fuel charge controlling valve operatively associated with said auxiliary engine; and means rendered effective by movement of said manually movable element from said one to said other position to establish an operative control connection between said manually operable valve control and said auxiliary engine fuel charge control valve.

7. The vehicle as defined in claim 5, wherein said manually movable element is located adjacent the steering wheel of the vehicle and is operative upon a single movement to start said auxiliary engine and establish all of the operational controls therefor, and operative upon a single movement in the opposite direction to stop said auxiliary engine and release all of its operational controls.

BEVERLY W. KEESE.
ARTHUR J. HAZEN.